United States Patent
Kruse

(10) Patent No.: US 6,277,784 B1
(45) Date of Patent: *Aug. 21, 2001

(54) METALLIC CATALYST CARRIER BODY, ESPECIALLY FOR SMALL ENGINES, FOIL ASSEMBLY STRUCTURE TO BE FORMED INTO A HOLLOW BODY AND METHOD FOR MANUFACTURING A METALLIC CATALYST CARRIER BODY

(75) Inventor: Carsten Kruse, Lohmar (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/456,713

(22) Filed: Dec. 9, 1999

Related U.S. Application Data

(63) Continuation of application No. PCT/EP98/03456, filed on Jun. 9, 1998.

(30) Foreign Application Priority Data

Jun. 9, 1997 (DE) ............................................... 197 24 263

(51) Int. Cl.$^7$ ............................. B01J 21/04; B01J 23/02; B01D 50/00; B01D 53/34; B21D 51/16
(52) U.S. Cl. ............... 502/527.19; 502/439; 502/527.14; 502/527.16; 502/527.17; 502/527.18; 29/890; 422/177; 422/181
(58) Field of Search ............................. 502/439, 527.19, 502/527.17, 527.14, 527.16, 527.21, 527.18, 320; 29/890; 422/177, 181

(56) References Cited

U.S. PATENT DOCUMENTS

| | | | |
|---|---|---|---|
| 5,403,558 | * 4/1995 | Kono et al. | 422/179 |
| 5,554,342 | * 9/1996 | Hirayama et al. | 422/174 |
| 5,593,645 | 1/1997 | Steenackers | 422/176 |
| 5,645,803 | * 7/1997 | Steenackers et al. | 422/177 |
| 5,768,889 | * 6/1998 | Maus et al. | 60/300 |

FOREIGN PATENT DOCUMENTS

| | | |
|---|---|---|
| 3622115C1 | 9/1987 | (DE) . |
| 0676534A1 | 10/1995 | (EP) . |
| WO 96/09893 | 4/1996 | (WO) . |

\* cited by examiner

*Primary Examiner*—Mark L. Bell
*Assistant Examiner*—Patricia L. Hailey
(74) *Attorney, Agent, or Firm*—Herbert L. Lerner; Laurence A. Greenberg; Werner H. Stemer

(57) ABSTRACT

A metallic catalyst carrier body for the cleaning or treatment of an exhaust-gas flow, in particular of small engines, includes a multiplicity of strip-shaped foils which are joined together in the form of a honeycomb structure. The foils form a foil assembly structure in which mutually adjacent respective foils are securely interconnected at connecting locations that are spaced apart from one another and offset alternatingly relative to one another. If the foil assembly is stretched, for example by winding the same into a hollow body, the honeycomb structure is formed, defining flow channels with at least one radial directional component in its interior, through the use of cells. A foil assembly structure which is also provided is suitable for use as a catalytic converter, in particular for small engines, by virtue of the fact that the foil assembly structure, which forms an initially essentially flat flexible honeycomb structure during stretching, can be wound into virtually any cross-sectional form of a hollow body and consequently can be adapted to existing exhaust pipe casing configurations. A method for manufacturing a metallic catalyst carrier body is also provided.

28 Claims, 2 Drawing Sheets

METALLIC CATALYST CARRIER BODY, ESPECIALLY FOR SMALL ENGINES, FOIL ASSEMBLY STRUCTURE TO BE FORMED INTO A HOLLOW BODY AND METHOD FOR MANUFACTURING A METALLIC CATALYST CARRIER BODY

CROSS-REFERENCE TO RELATED APPLICATION

This application is a continuation of copending International Application No. PCT/EP98/03456, filed Jun. 9, 1998, which designated the United States.

BACKGROUND OF THE INVENTION

Field of the Invention

The invention relates to a metallic catalyst carrier body or support structure for the cleaning or treatment of an exhaust gas flow, in particular of a small engine, having a longitudinal axis and a honeycomb structure formed by a multiplicity of strip-shaped foils. The invention also relates to a foil assembly structure which is used in particular as a catalyst carrier body, preferably for small engines. The invention additionally relates to a method for manufacturing a metallic catalyst carrier body.

Metallic catalyst carrier bodies with a radial type of construction are known. Such a radial catalytic converter is described, for example, in International Publication No. WO 96/09893. The known radial catalytic converter includes individual disks which are disposed in series one against the other, which lie one on top of the other and in which radially extending flow channels are incorporated. The radial catalytic converter described therein is constructed as a hollow body into which the exhaust-gas flow to be treated flows. The flow enters into its interior, is deflected there and is directed outward in a radial direction through the flow channels between the individual disks.

The disadvantage of the radial catalytic converters described therein is that they include a multiplicity of individual, partially structured disks which have to be handled during production and held together as an assembly. They are therefore also relatively cost-intensive in their manufacture and, for that reason, not unreservedly suitable as a catalyst carrier body for use for small engines.

German Patent DE 36 22 115 C1 discloses a catalyst carrier body with an axial type of construction which includes an expanded partial laminated composite. However, that type of structure is relatively complicated to manufacture and secure in place and that prior art does not allow an application for radial catalytic converters.

SUMMARY OF THE INVENTION

It is accordingly an object of the invention to provide a metallic catalyst carrier body, especially for small engines, which provides a compact, efficient, radial catalytic converter that can be used in particular for small engines, does not require any increase in dimensions of an exhaust system and can be manufactured at low cost, a prefabricated semi-finished product in the form of a foil assembly structure which can easily be formed into a hollow catalyst carrier body, in particular for small engines, and a simple method for manufacturing a metallic catalyst carrier body without significant additional manufacturing devices, which overcome the hereinafore-mentioned disadvantages of the heretofore-known devices and methods of this general type.

With the foregoing and other objects in view there is provided, in accordance with the invention, a metallic catalyst carrier body for cleaning or treating an exhaust-gas flow, in particular of a small engine, comprising a longitudinal axis; a honeycomb structure having a multiplicity of strip-shaped foils resistant to high temperatures and corrosion, including adjacent foils securely interconnected at mutually spaced apart and alternatingly offset connecting locations; the foils forming a foil assembly structure or foil packet body which in the completed state has a block-like formation and is wound about the longitudinal axis into a hollow body stretching the foil assembly structure and forming flow channels in the honeycomb structure; and the flow channels extending in a perpendicular direction with respect to the longitudinal axis of the carrier body or having at least a radial directional component pointing in a direction perpendicular to the longitudinal axis.

A major advantage of the catalyst carrier body according to the invention is that the use of a prefabricated semifinished product in the form of a foil assembly has the effect on one hand of avoiding numerous individual parts in the form of disks, as are known in the prior art, and on the other hand of requiring no complicated manufacturing processes for manufacturing the actual catalyst carrier body by simply laying the inherently flexible foil assembly around a mandrel, a tube or the like to form an essentially cylindrical or frustoconical hollow body. When the foil assembly has been formed into a hollow body, all that is required is to interconnect the two end foils, then butting one against the other, without further devices being required for holding the catalyst carrier body together or keeping the catalyst carrier body in its form as a whole. This makes it possible, in particular, for relatively small catalytic converters for treating exhaust-gas flows of small engines to be manufactured at low cost and easily adapted to the dimensions of an existing, laid-out exhaust pipe system.

With the objects of the invention in view there is also provided a foil assembly structure to be formed into a hollow body of rotation, in particular for use as a catalyst carrier body, preferably for small engines, comprising a multiplicity of strip-shaped foils formed of a material resistant to high temperature corrosion, the foils having a catalytically active coating, the foils securely interconnected at spaced apart connecting locations producing a block-like assembly in a manufactured state in which foils disposed alongside one another touch, and the foils including mutually alternatingly offset adjacent foils producing an essentially flat flexible honeycomb structure through which an exhaust gas can flow upon stretching the foil assembly structure.

The flexible honeycomb structure according to the invention may preferably also be stretched by winding a honeycomb structure with an inherently flat form around a mandrel or a tube. As a result, with a corresponding connection of end pieces of the flexible honeycomb structure, an essentially cylindrical or frustoconical hollow body is produced. This cylindrical hollow body is inherently stable and requires no further retaining elements to keep it in its form. Therefore, it can be readily integrated into corresponding exhaust systems, in particular for small engines, to be precise in such a way that there is no need to change the dimensions of an existing exhaust system. Such a catalyst carrier body manufactured from a foil assembly structure according to the invention is also very inexpensive to manufacture.

In accordance with another feature of the invention, the foils which are respectively disposed alongside one another are provided with connecting locations of a linear form over the width of the foil. Such linear connecting locations, which run obliquely or essentially at right angles with respect to the longitudinal side edge of the strip-shaped foils, offer the advantage of making the foil assembly structure that is produced very stretchable and consequently producing a very flexible honeycomb structure, which can also be wound onto a mandrel having a relatively small diameter.

In accordance with a further feature of the invention, the connecting locations are constructed in the form of surface areas. The connecting locations are preferably constructed as rectangular areas, which run essentially perpendicularly with respect to the longitudinal side edges of the strip-shaped foils or, according to a further preferred exemplary embodiment, may also be disposed obliquely thereto.

In accordance with an added feature of the invention, the connecting locations have a triangular or trapezoidal form. Triangular or trapezoidal connecting locations have the advantage that, when the foil assembly structure is wound into a cylindrical hollow body, its form does not have any barrel-shaped deviations from the cylindrical form, as is the case with connecting locations running essentially perpendicularly with respect to the longitudinal side edge of the strip-like foil, of a linear or rectangular construction in the form of a surface area.

In accordance with an additional feature of the invention, in order to provide better adaptation to conical forms, the spacings between the individual connecting locations increase in the direction of the strip-shaped foils and/or the width of the connecting locations decrease. Corresponding channels with increasing cross-sectional areas are therefore later produced when the body is formed into a hollow truncated cone. The fluid entry area may be formed by a frustoconical form, which in the case of radial catalytic converters is very favorable for uniform flow distribution, being approximately funnel-shaped, i.e. conically tapering, in the direction of flow.

In accordance with yet another feature of the invention, the foil assembly structure can be manufactured in a particularly simple way by the foils being adhesively bonded, brazed or welded at the connecting locations. Ultrasonic welding is particularly preferred for this purpose. These procedures can be carried out quickly and inexpensively, with the result that the foil assembly structure prepared as a prefabricated semifinished product is itself available at low cost.

When the foil assembly structure is wound into a cylindrical hollow body, the individual cells of the honeycomb structure form flow channels running in radial directions. When using the foil assembly structure as a catalyst carrier body, the foils preferably are formed of temperature-resistant material and are preferably coated with catalyst before manufacturing the foil assembly structure or the cylindrical hollow body. However, it is also possible to apply the catalyst coating after completion of the foil assembly structure or after completion of the catalyst carrier body constructed in the form of a cylindrical hollow body.

It should be pointed out that honeycomb structures according to the invention can also be easily provided with a washcoat and/or a catalytically active coating, since, because of the many different flow paths which are present, this coating can be applied by immersion or sprinkling from various directions. The removal of excess coating material can be achieved, for example, in a very defined and uniform manner by subsequent rotation of the catalyst carrier body about its longitudinal axis. with the objects of the invention in view there is additionally provided a method for manufacturing a metallic catalyst carrier body for cleaning or treating an exhaust-gas flow, in particular of a small engine, which comprises placing a multiplicity of strip-shaped foils together to form a foil assembly structure having mutually adjacent foils; securely interconnecting the mutually adjacent foils at mutually spaced apart and alternatingly offset connecting locations; and winding the foil assembly structure about a longitudinal axis into a hollow body causing stretching of the foil assembly structure into a honeycomb structure having flow channels with at least a directional component pointing in a direction perpendicular to the longitudinal axis.

Other features which are considered as characteristic for the invention are set forth in the appended claims.

Although the invention is illustrated and described herein as embodied in a metallic catalyst carrier body, especially for small engines, a foil assembly structure to be formed into a hollow body and a method for manufacturing a metallic catalyst carrier body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
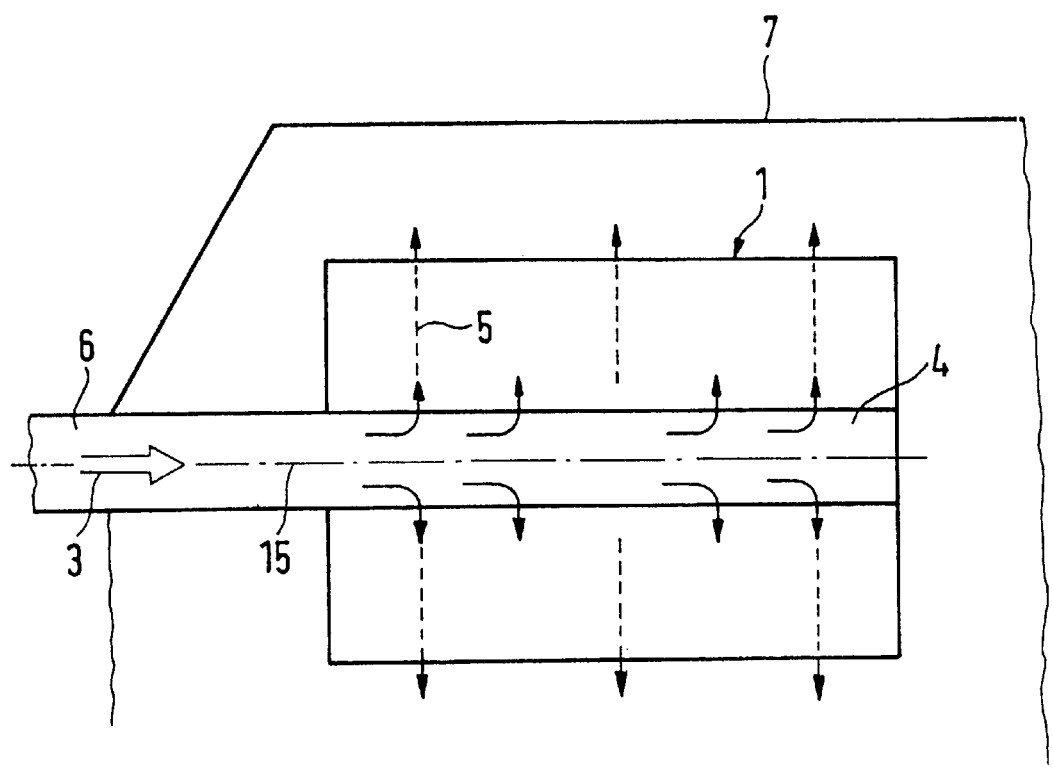
FIG. 1 is a fragmentary, diagrammatic, sectional view of a basic configuration of a radial catalytic converter according to the invention in an exhaust system, with a basic representation of a flow in an interior of the catalyst carrier body.
Figure 2:
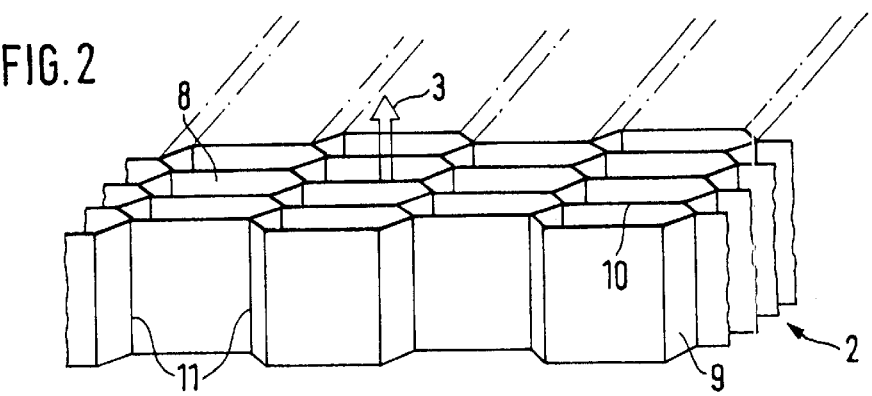
FIG. 2 is a fragmentary, perspective view of a foil assembly structure according to the invention, constructed in the form of a honeycomb structure element.

Referring now to the figures of the drawings in detail and first, particularly, to FIG. 1 thereof, there is seen a basic configuration of a radial catalytic converter having a catalyst carrier body 1 according to the invention in an exhaust pipe casing 7, in which flow paths 3, 5 are represented. The catalyst carrier body or support structure 1 is constructed in the form of a hollow body having an interior with a hollow region 4. An exhaust-gas flow along the flow path 3 is fed through an exhaust pipe 6 to the inner hollow region 4 of the catalyst carrier body 1. The inner hollow region 4 is closed off at its extreme end, which lies opposite an entry region of the exhaust-gas flow along the path 3 into the catalyst carrier body 1. As a result, the exhaust-gas flow along the path 3 is deflected from the inner hollow region 4 and conducted in a radial direction through flow channels 8 formed in a honeycomb structure, as is seen in FIG. 2. The flow through the flow channels 8 extends radially outwardly into a space which surrounds the catalyst carrier body 1 in the exhaust pipe casing 7. In this case, the exhaust-gas flow along the path 3 is conducted in the exhaust pipe 6 in a coaxial direction with respect to a longitudinal axis 15 of the catalyst carrier body 1.

FIG. 2 shows the honeycomb structure which is obtained by stretching the foil assembly structure 2, according to one exemplary embodiment of the invention. Foils which are respectively disposed alongside one another are securely interconnected at linear connecting locations 11 which are offset alternatingly in relation to one another. That fact has the effect that, when the initially essentially flat foil assembly structure 2 is stretched, an essentially flat flexible honeycomb structure with the flow channels 8 is obtained. In this case the flow channels 8 are respectively formed by foils 9, 10 disposed alongside one another. The exhaust-gas flow along the path 3 is conducted through the flow channels 8 in a direction perpendicular to the longitudinal axis 15 of the catalyst carrier body 1. The flat honeycomb structure achieved after stretching is so flexible that it can be wound into various forms and consequently a catalyst carrier body of the desired cross-sectional form can be easily achieved. Such a flat honeycomb structure is preferably wound around a mandrel to form an essentially cylindrical hollow body. However, it is also possible with foils chosen to be appropriately thin and with an appropriately flexible honeycomb structure, to wind the flat original honeycomb structure around an angular core such as, for example, a triangle, square or polygon, or an elliptical or more or less flatly oval form. In this way, a catalyst carrier body which can be brought into a form that is easily adaptable to the form of casing dictated by the exhaust pipe casing 7 can be achieved.

Figure 3A:
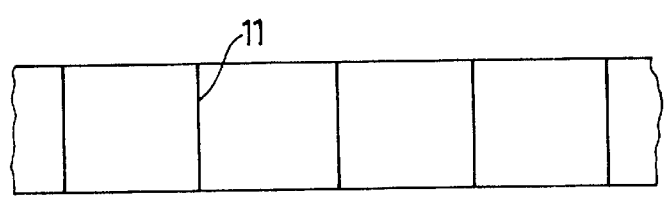
FIGS. 3a to 3e are fragmentary, elevational views of exemplary embodiments of the honeycomb structure shown in FIG. 2, according to differently constructed foils disposed alongside one another in the foil assembly structure.

Various embodiments of connecting locations 11, 12, 13, 14 of the foils 9, 10 to be connected are represented in FIGS. 3*a* to 3*e*. In FIG. 3*a*, linear connecting locations 11 are formed for foils 9, 10 disposed alongside one another. These linear connecting locations 11 run essentially perpendicularly to longitudinal side edges of the strip-shaped foils 9, 10.

Figure 3B:
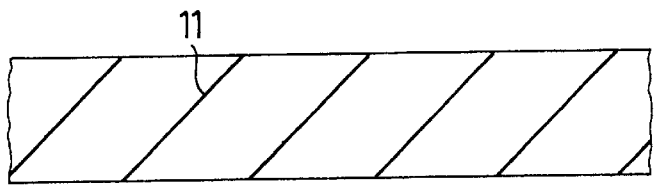

In FIG. 3*b*, the linear connecting locations 11 are formed obliquely with respect to the longitudinal side edges of the strip-shaped foils 9, 10. Such an oblique formation of the connecting locations 11 has the effect of forming flow channels 8 which are led essentially diagonally with respect to a catalyst carrier body 1 formed as a hollow body. These flow channels 8 have a directional component along the flow path 5 shown in FIG. 1 running in a perpendicular direction with respect to the longitudinal axis 15. The advantage of the diagonally running flow channels 8 is that the residence time of the exhaust gas along the path 3 flowing through the catalyst carrier body is increased and consequently the effectiveness of the treatment by the catalyst is increased.

Figure 3C:
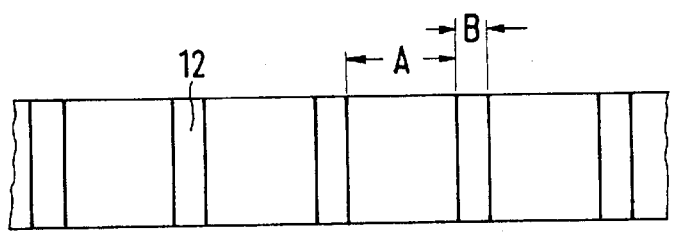

In FIG. 3*c*, connecting locations 12 in the form of surface areas which extend essentially perpendicularly with respect to the longitudinal side edges of the strip-shaped foils 9, 10 are shown with widths B and spacings A in relation to one another. A foil assembly structure 2 in which the foils 9, 10 disposed alongside one another are interconnected by such connecting locations 12 in the form of rectangular areas has a greater strength when it is stretched into a honeycomb structure.

Figure 3D:
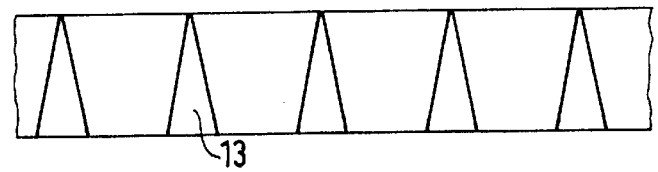
Figure 3E:
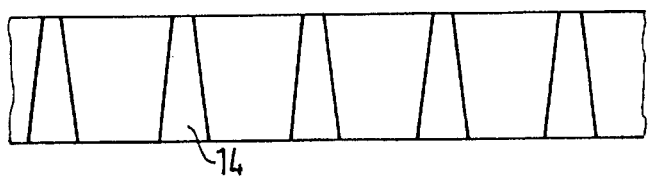

Connecting locations 13 in the form of surface areas which have a triangular form are represented in FIG. 3*d*. If linear connecting locations 11 or 12 according to FIGS. 3*a* and 3*c* are used, a barrel-shaped deviation from the exact cylindrical form results when the honeycomb structure is wound into an essentially cylindrical hollow body. This can be avoided by triangular connecting locations 13 or by trapezoidal connecting locations 14, as are represented in FIG. 3*e*. During the formation of connecting locations 12, 13, 14 in the form of surface areas, it is possible on one hand for the entire surface area of the respective connecting location 12, 13 or 14 to be securely connected to the adjacent foil 9 or 10. However, it is also possible on the other hand for only side lines, bounding the surface area, to form a direct connection with the respective adjacent foil 9 or 10.

The catalyst carrier body which can be manufactured from a flat flexible honeycomb structure as a prefabricated semifinished element provides a possibility for producing a compact catalytic converter which provides efficient treatment and can be manufactured at low cost. Such a catalytic converter is suitable in particular for the treatment of an exhaust-gas flow of small engines. The use of a catalyst carrier body which has such a simple construction and can be easily manufactured consequently means that there is no significant increase in the manufacturing costs of the equipment fitted with small engines. In addition, because of the treated exhaust-gas flow, such a catalyst carrier body additionally ensures a contribution to improving the ecological balance of such equipment, together with improving the health conditions for persons using the equipment.

I claim:

1. A metallic catalyst carrier body for cleaning an exhaust-gas flow, comprising:

a longitudinal axis;

a honeycomb structure having a multiplicity of strip-shaped foils including adjacent foils securely interconnected at mutually spaced apart and alternatingly offset connecting locations;

said foils forming a foil assembly structure wound about said longitudinal axis into a hollow body stretching said foil assembly structure and forming flow channels in said honeycomb structure; and said flow channels having at least a directional component pointing in a direction perpendicular to the longitudinal axis.

2. The catalyst carrier body according to claim 1, wherein said hollow body is selected from the group consisting of a hollow cylinder and a hollow truncated cone.

3. The catalyst carrier body according to claim 1, wherein said foils have a width, and said connecting locations have a Linear form over said width of said foils.

4. The catalyst carrier body according to claim 1, wherein said connecting locations are surface areas.

5. The catalyst carrier body according to claim 3, wherein said connecting locations extend obliquely over said width of said foils.

6. The catalyst carrier body according to claim 4, wherein said foils have a width, and said connecting locations extend obliquely over said width of said foils.

7. The catalyst carrier body according to claim 4, wherein said connecting locations have a shape selected from the group consisting of triangular and trapezoidal.

8. The catalyst carrier body according to claim 1, wherein said connecting locations have a spacing therebetween increasing along said strip-shaped foils.

9. The catalyst carrier body according to claim 1, wherein said connecting locations have a width decreasing along said strip-shaped foils.

10. The catalyst carrier body according to claim 1, wherein said connecting locations have a spacing therebetween increasing along said strip-shaped foils and have a width decreasing along said strip-shaped foils.

11. The catalyst carrier body according to claim 1, wherein said foils are connected at said connecting locations by a joining technique selected from the group consisting of adhesive bonding, brazing, welding and ultrasonic welding.

12. The catalyst carrier body according to claim 1, wherein said foils are formed of a chromium-aluminum-steel alloy.

13. A foil assembly structure to be formed into a hollow body, comprising:

a multiplicity of strip-shaped foils formed of a material resistant to high temperature corrosion, said foils having a catalytically active coating, said foils securely interconnected at spaced apart connecting locations, and said foils including mutually alternatingly offset adjacent foils producing a flexible honeycomb structure through which an exhaust gas can flow upon stretching the foil assembly structure.

14. The structure according to claim 13, wherein said foils are formed into a hollow body disposed about a longitudinal axis, and said hollow body has flow channels with at least one radial directional component.

15. The structure according to claim 14, wherein said hollow body is selected from the group consisting of a hollow cylinder and a hollow truncated cone.

16. The structure according to claim 13, wherein said foils have a width, and said connecting locations have a linear form over said width of said foils.

17. The structure according to claim 13, wherein said connecting locations are surface areas.

18. The structure according to claim 16, wherein said connecting locations extend obliquely over said width of said foils.

19. The structure according to claim 17, wherein said foils have a width, and said connecting locations extend obliquely over said width of said foils.

20. The structure according to claim 17, wherein said connecting locations have a shape selected from the group consisting of triangular and trapezoidal.

21. The structure according to claim 13, wherein said connecting locations have a spacing therebetween increasing along said strip-shaped foils.

22. The structure according to claim 13, wherein said connecting locations have a width decreasing along said strip-shaped foils.

23. The structure according to claim 13, wherein said connecting locations have a spacing therebetween increasing along said strip-shaped foils and have a width decreasing along said strip-shaped foils.

24. The structure according to claim 13, wherein said foils are connected at said connecting locations by a joining technique selected from the group consisting of adhesive bonding, brazing, welding and ultrasonic welding.

25. The structure according to claim 13, wherein said foils are formed of a chromium-aluminum-steel alloy.

26. A method for manufacturing a metallic catalyst carrier body for cleaning an exhaust-gas flow, which comprises:

placing a multiplicity of strip-shaped foils together to form a foil assembly structure having mutually adjacent foils;

securely interconnecting the mutually adjacent foils at mutually spaced apart and alternatingly offset connecting locations; and winding the foil assembly structure about a longitudinal axis into a hollow body causing stretching of the foil assembly structure into a honeycomb structure having flow channels with at least a directional component pointing in a direction perpendicular to the longitudinal axis.

27. The method according to claim 26, which comprises carrying out the winding step by winding about a mandrel.

28. The method according to claim 26, which comprises producing the catalyst carrier body from a foil assembly structure having a multiplicity of strip-shaped foils formed of a material resistant to high temperature corrosion, the foils having a catalytically active coating, the foils securely interconnected at spaced apart connecting locations, and the foils including mutually alternatingly offset adjacent foils producing a flexible honeycomb structure through which an exhaust gas can flow upon stretching the foil assembly structure.

* * * * *